US009723600B2

(12) United States Patent
McCoy et al.

(10) Patent No.: US 9,723,600 B2
(45) Date of Patent: *Aug. 1, 2017

(54) DYNAMIC ALLOCATION OF COMMUNICATION RESOURCES IN A WIRELESS SYSTEM

(75) Inventors: James W. McCoy, Austin, TX (US); Leo G. Dehner, Austin, TX (US)

(73) Assignee: APPLE INC., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/544,887

(22) Filed: Jul. 9, 2012

(65) Prior Publication Data

US 2013/0010746 A1 Jan. 10, 2013

Related U.S. Application Data

(63) Continuation of application No. 12/014,530, filed on Jan. 15, 2008, now Pat. No. 8,218,509.

(51) Int. Cl.
*H04W 72/04* (2009.01)
*H04W 72/14* (2009.01)
*H04L 5/00* (2006.01)

(52) U.S. Cl.
CPC ......... *H04W 72/042* (2013.01); *H04L 5/0007* (2013.01); *H04L 5/0053* (2013.01); *H04L 5/0082* (2013.01); *H04L 5/0094* (2013.01); *H04L 5/0096* (2013.01); *H04W 72/14* (2013.01)

(58) Field of Classification Search
None
See application file for complete search history.

(56) References Cited

U.S. PATENT DOCUMENTS

| | | | | |
|---|---|---|---|---|
| 7,200,124 | B2* | 4/2007 | Kim et al. | 370/324 |
| 7,362,741 | B2* | 4/2008 | Nguyen | 370/345 |
| 7,567,536 | B2* | 7/2009 | Czaja et al. | 370/332 |
| 2003/0117980 | A1* | 6/2003 | Kim et al. | 370/332 |
| 2004/0160936 | A1* | 8/2004 | Liu et al. | 370/348 |
| 2008/0117891 | A1* | 5/2008 | Damnjanovic et al. | 370/345 |
| 2008/0151803 | A1* | 6/2008 | Sundaresan | 370/311 |
| 2009/0046573 | A1* | 2/2009 | Damnjanovic | 370/216 |
| 2009/0046649 | A1* | 2/2009 | Gao et al. | 370/329 |
| 2009/0046672 | A1* | 2/2009 | Malladi et al. | 370/336 |
| 2009/0109916 | A1* | 4/2009 | Berg et al. | 370/329 |
| 2009/0117931 | A1* | 5/2009 | Shin et al. | 455/522 |
| 2009/0161618 | A1* | 6/2009 | Johansson et al. | 370/329 |
| 2009/0175232 | A1* | 7/2009 | Kolding | 370/329 |
| 2009/0175233 | A1* | 7/2009 | Ojala et al. | 370/329 |
| 2009/0180433 | A1* | 7/2009 | Ahn et al. | 370/329 |

(Continued)

*Primary Examiner* — Bunjob Jaroenchonwanit
(74) *Attorney, Agent, or Firm* — Fay Kaplun & Marcin, LLP

(57) ABSTRACT

A method of receiving information by a wireless communication device is provided. The method includes receiving a plurality of wireless subframes at a periodic interval, wherein an interval duration of the periodic interval is greater than a duration of each of the plurality of wireless subframes. The method further includes determining for each wireless subframe of the plurality whether the wireless subframe includes a grant resource that indicates that a resource unit pattern of a plurality of selectively assignable resource unit patterns of resource units of the subframe includes information for the communication device. A method of transmitting information by the wireless communication device is also provided.

20 Claims, 6 Drawing Sheets

(56) References Cited

U.S. PATENT DOCUMENTS

| | | | |
|---|---|---|---|
| 2009/0323622 A1* | 12/2009 | Yamada et al. | 370/329 |
| 2010/0002638 A1* | 1/2010 | Park et al. | 370/329 |
| 2010/0087200 A1* | 4/2010 | Ishii et al. | 455/450 |
| 2010/0091720 A1* | 4/2010 | Chun et al. | 370/329 |
| 2010/0098015 A1* | 4/2010 | Seo et al. | 370/329 |
| 2010/0118800 A1* | 5/2010 | Kim et al. | 370/329 |
| 2010/0142456 A1* | 6/2010 | Lee et al. | 370/329 |
| 2010/0182974 A1* | 7/2010 | Barraclough et al. | 370/329 |
| 2010/0195522 A1* | 8/2010 | Lee et al. | 370/252 |
| 2010/0272035 A1* | 10/2010 | Park et al. | 370/329 |
| 2010/0272037 A1* | 10/2010 | Lee et al. | 370/329 |
| 2010/0278047 A1* | 11/2010 | Koorapaty et al. | 370/241 |
| 2010/0284347 A1* | 11/2010 | Ahn et al. | 370/329 |
| 2010/0284360 A1* | 11/2010 | Dalsgaard et al. | 370/329 |
| 2011/0216713 A1* | 9/2011 | Kim et al. | 370/329 |
| 2011/0249629 A1* | 10/2011 | Ko et al. | 370/329 |

* cited by examiner

DYNAMIC ALLOCATION OF COMMUNICATION RESOURCES IN A WIRELESS SYSTEM

PRIORITY

This application is a continuation of and claims priority to co-owned and co-pending U.S. patent application Ser. No. 12/014,530 entitled "DYNAMIC ALLOCATION OF COMMUNICATION RESOURCES IN A WIRELESS SYSTEM", filed Jan. 15, 2008, the foregoing incorporated herein by reference in its entirety.

BACKGROUND

Field

This disclosure relates generally to communication systems and methods, and more specifically, to systems and method for dynamic allocation of communication resources.

Related Art

Conventional communication systems involve a user equipment communicating with base stations using uplink and downlink channels. User equipments, such as mobile phones, PDAs, or other types of mobile devices have limited battery power. Conservation of the battery power is an important objective in implementing communication systems. Various techniques are used in such communication systems to conserve power. For example, the eNodeB scheduler, coupled to one more base stations, may schedule certain communication resources for a particular user equipment. The user equipment may then need to listen to a control channel at only those times for which it is scheduled to receive or transmit on a shared communication channel. At other times, the user equipment may go to sleep and thus conserve power. In conventional communication systems, however, the scheduling of communication resources is not frequency selective. Instead, the user equipment in response to a scheduling request is granted a particular communication resource associated with a certain frequency.

The inability of conventional communication systems to allocate frequency resources dynamically results in sub-optimal performance. For example, the eNodeB scheduler may fail to schedule a particular user equipment for use of a frequency resource that results in maximum gain for that particular user equipment. Accordingly, there is a need for systems and methods for dynamic allocation of communication resources.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
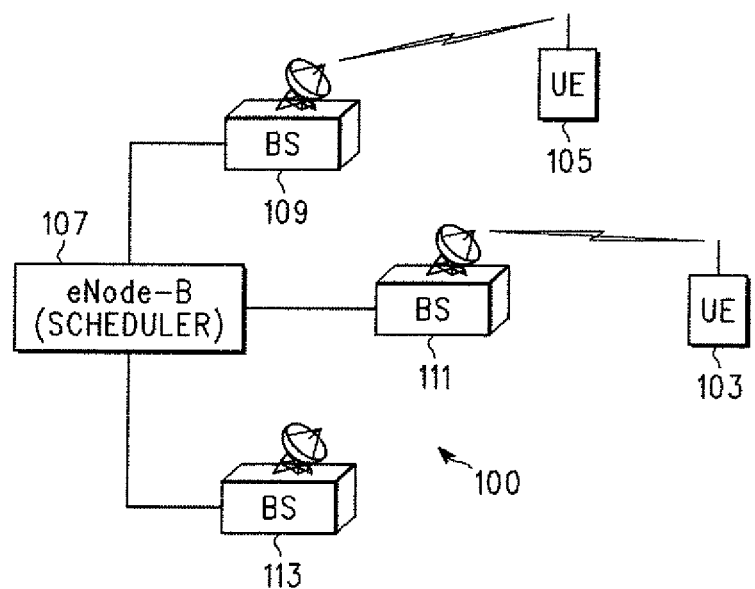
FIG. 1 shows an exemplary communication system.

In one aspect, a method of receiving information by a wireless communication device is provided. The method includes receiving a first subframe of information by the communication device at a first time, the first subframe indicating an occurrence of a second subframe to be received at a second time occurring subsequently. The method further includes receiving the second subframe of information by the communication device at the second time, the second subframe including first control channel resource elements and first shared channel resource elements conveyed by a first plurality of subcarrier frequencies over a first plurality of time slots, each of the first shared channel resource elements being defined by a single time slot of the first plurality of time slots and a single subcarrier frequency of the first plurality of subcarrier frequencies of the first subframe, the wireless communication device decoding at least one of the first control channel resource elements to determine if the first control channel resource elements include a grant resource that indicates that a resource element pattern of the first shared channel resource elements includes information directed for the wireless communication device, the resource element pattern being of a first plurality of selectively assignable resource element patterns of the first shared channel resource elements.

The method further includes receiving a third subframe of information by the communication device at a third time, the third time being subsequent to the second time, the third subframe including second control channel resource elements and second shared channel resource elements conveyed by a second plurality of subcarrier frequencies over a second plurality of time slots, each of the second shared channel resource elements being defined by a single time slot of the second plurality of time slots and a single subcarrier frequency of the second plurality of subcarrier frequencies of the third subframe, the wireless communication device decoding at least one of the second control channel resource elements to determine if the second control channel resource elements includes a grant resource that indicates that a resource element pattern of the second shared channel resource elements includes information directed for the wireless communication device, the resource element pattern being of a second plurality of selectively assignable resource element patterns of the second shared channel resource elements, wherein the second time and the third time are separated by a first time interval, the first time interval is greater than a duration of the second subframe and greater than a duration of the third subframe.

In another aspect, a method of receiving information by a wireless communication device is provided. The method includes receiving a plurality of wireless subframes at a periodic interval, wherein an interval duration of the periodic interval is greater than a duration of each of the plurality of wireless subframes. The method further includes determining for each wireless subframe of the plurality whether the wireless subframe includes a grant resource that indicates that a resource unit pattern of a plurality of selectively assignable resource unit patterns of resource units of the subframe includes information for the communication device.

In yet another aspect, a method of transmitting information is provided. The method includes transmitting a plurality of wireless subframes at a periodic interval, wherein each of the plurality of wireless subframes is intended to be received by a wireless communication device, wherein an interval duration of the periodic interval is greater than a duration of each of the plurality of wireless subframes, each subframe of the plurality of wireless subframes including a plurality of selectively assignable resource element patterns, each subframe of the plurality of wireless subframes including a plurality of grant resources, wherein if a subframe includes information for the wireless communication device, a grant resource of the plurality of grant resources indicates which resource element pattern of the plurality of selectively assignable resource element patterns of that subframe includes information for the wireless communication device.

FIG. 1 shows an exemplary communication system 100. Exemplary communication system 100 may be a 4G mobile communication system or any other communication system in which a scheduler is used to allocate resources to mobile devices. Exemplary communication system 100 may include user equipments (103 and 105, for example), which may communicate with base stations (109, 111, and 113, for example). User equipment 103 may be a wireless communication device, such as a mobile phone, a personal digital assistant, or any other wireless device. Each base station may serve multiple user equipments. Communication system 100 may further include an evolved NODE-B (also referred to as an eNode-B) 107 including a scheduler. eNode-B 107 may be coupled to several base stations and may control one or more base stations. eNodeB 107 may be configured to allocate resources among control and data channels for both uplink and downlink transmissions. As used herein, uplink transmissions are transmissions from UEs (103, for example) to base stations (111, for example) and downlink transmissions are from base stations (111, for example) to UEs (103, for example). eNode-B 107 may schedule resources for UEs based on currently available resources (subcarriers and time slots, for example), channel quality, UE capabilities, type of data transfer, quality of service requirements, and/or other constraints, eNode-B 107 and UEs may communicate using 3GPP Long Term Evolution (LTE) cellular technology. The physical layer corresponding to LTE may employ orthogonal frequency division multiple access (OFDMA) techniques and multiple-input multiple-output (MIMO) techniques.

Figure 2:
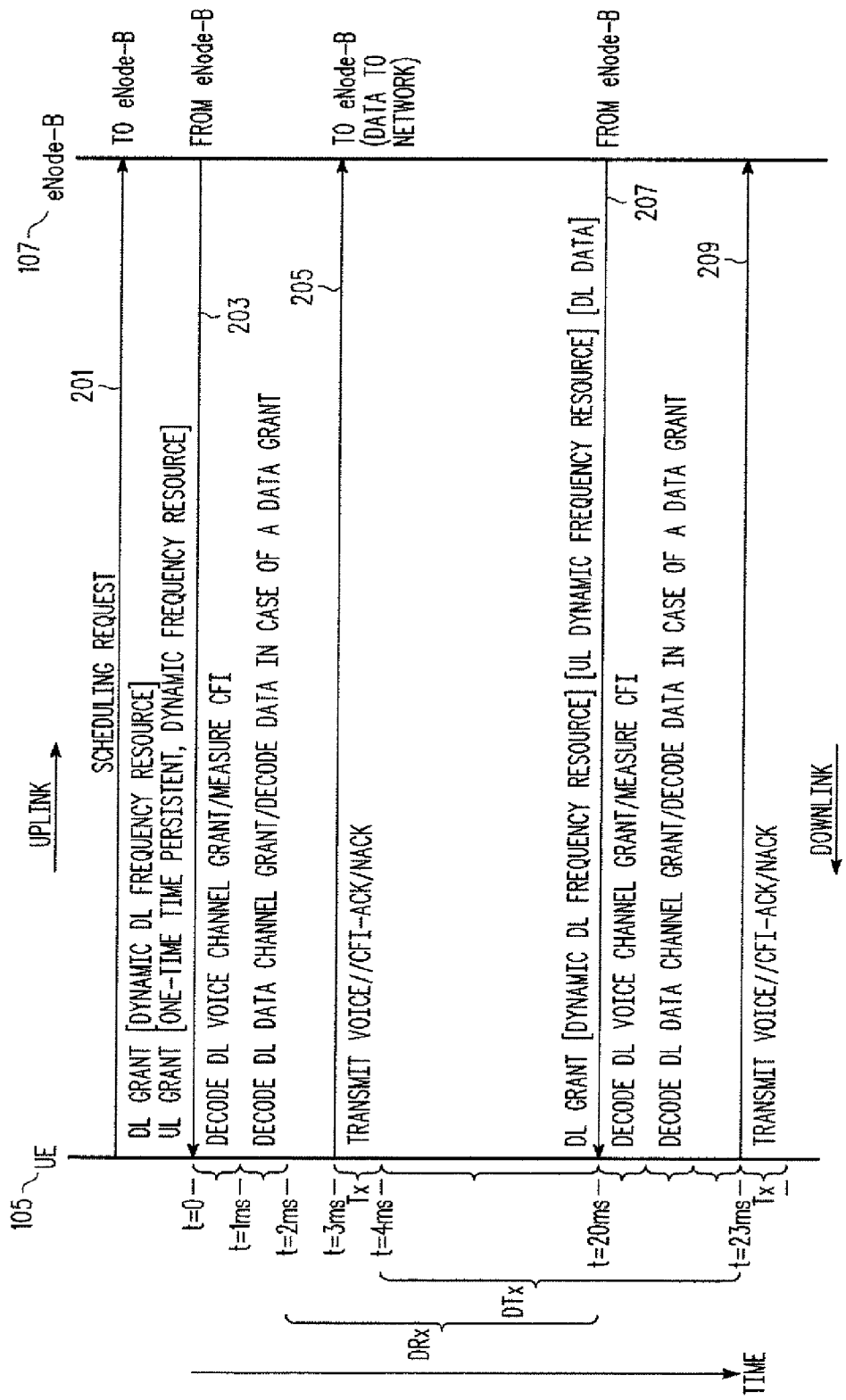
FIG. 2 shows exemplary set of messages that may be exchanged between a user equipment and other devices in the exemplary communication system of FIG. 1.

FIG. 2 shows exemplary set of messages that may be exchanged between a user equipment and other devices in the exemplary communication system of FIG. 1. By way of example, UE 105 may send a scheduling request via message 201 to eNode-B 107. In response to the scheduling request, at time t=0, eNode-B 107 may respond via message 203 by providing a downlink grant (DL Grant [Dynamic Frequency Resource]) and an uplink grant (UL Grant [One-time Time Persistent, Dynamic Frequency Resource]) to UE 105. At a later time, for example, at time t=1 ms, UE 105 may decode downlink voice grant and measure channel feedback information (CFI). At a later time, for example, at time t=2 ms, UE 105 may decode downlink data grant and decode data in case of a data grant. At a later time, for example, at time t=3 ms, UE 105 may transmit via message 205, voice and send control information, such as CFI and Ack/Nack to eNode-B 107. Between time t=4 ms and time t=20 ms, to conserve power, UE 105 may be turned off or may be switched into a low power mode. UE 105 may include various circuitry, such as receiving circuitry and user interface circuitry. In one embodiment, only the receiving circuitry may be turned off or put into low power mode. At time t=20 ms, UE 105 may receive via message 207 a downlink grant (DL Grant [Dynamic Frequency Resource]) and an uplink grant (UL Grant [One-time Time Persistent, Dynamic Frequency Resource]) from eNode-B 107. At a later time, UE 105 may decode downlink voice grant and measure channel feedback information (CFI). At a later time, UE 105 may decode downlink data grant and decode data in case of a data channel grant. At a later time, for example, at time t=23 ms, UE 105 may transmit via message 209, voice and send control information, such as CFI and Ack/Nack to eNode-B 107. Although FIG. 2 shows a specific sequence of messages, other sequences of messages could also be used. Moreover, although FIG. 2 shows specific messages being exchanged, other messages may also be exchanged.

Figure 3:
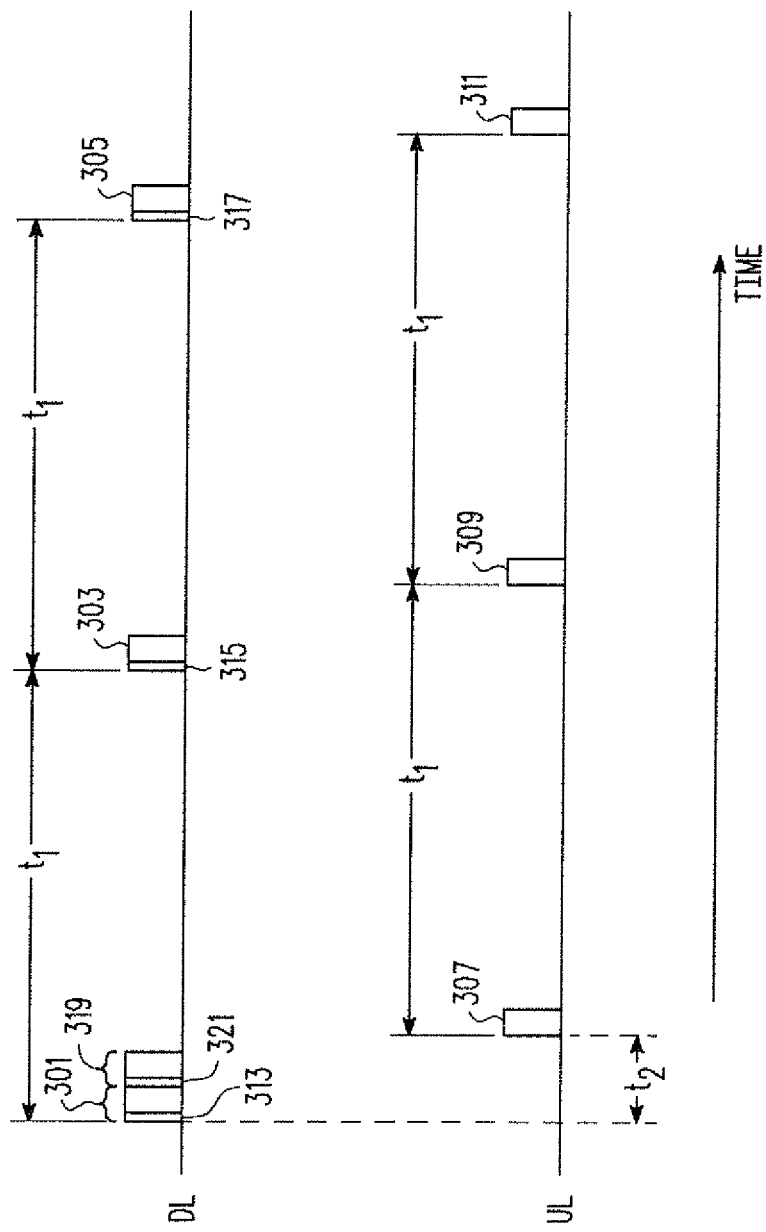
FIG. 3 shows exemplary subframes being transmitted on an uplink transmission and a downlink transmission.

FIG. 3 shows exemplary subframes being transmitted on an uplink transmission and a downlink transmission between a wireless communication device, for example UE 103 and a scheduler, for example, eNode-B 107. UE 103 may receive a subframe 301. Consistent with one embodiment, subframe 301 may be a subframe of a Long Term Evolution (LTE) frame and thus may be 1 ms in duration. Subframe 301 may have a structure consistent with the LTE or any other suitable frame structure. Subframe 301 may include resource elements, described further with respect to FIGS. 4 and 5. Subframe 301 may include a portion 313, including resource elements corresponding to the physical downlink control channel (PDCCH) mapped to up to the first three OFDM symbols. The remaining portion of subframe 301 may include resource elements corresponding to the physical downlink shared channel (PDSCH). Subframe 301 may also indicate a second subframe to be received at a second time occurring subsequently. In one embodiment, UE 103 thereby receives a persistent or a semi-persistent grant.

In one embodiment, subsequent to the receipt of subframe 301, the UE (105 of FIG. 1, for example) may receive subframe 319. Subframe 319 may include a portion 321, including resource elements corresponding to the physical downlink control channel (PDCCH) mapped to up to the first three OFDM symbols. These resource elements may convey information regarding the downlink data grant. The remaining portion of subframe 319 may include resource elements corresponding to the physical downlink shared channel (PDSCH). The resource elements may be selectively assigned based on any pattern. By way of example, the second subframe may include control channel resource elements (for example, PDCCH related resource elements) and shared channel resource elements (for example, PDSCH related resource elements) conveyed by a plurality of subcarrier frequencies over a plurality of time slots, each of the shared channel resource elements may be defined by a single time slot of the plurality of time slots and a single subcarrier frequency of the plurality of subcarrier frequencies of the subframe. Grant resources, such as downlink data grants may provide information to a UE, such as UE 103, indication as to which resource element pattern of a plurality of selectively assignable resource element patterns of a particular subframe include information for that UE.

The UE may decode at least one of the control channel resource elements to determine if the control channel resource elements include a grant resource that indicates that a resource element pattern of the shared channel resource elements includes information directed for the wireless communication device. The UE may also decode the resource element pattern of the shared channel resource elements to obtain information regarding a voice call, for example.

At a subsequent time, an interval $t_1$ following the receipt of subframe 301, UE 103 may receive another subframe 303. Subframe 303 may also include resource elements, described further with respect to FIGS. 4 and 5. Subframe 303 may include a portion 315, including resource elements corresponding to the physical downlink control channel (PDCCH) mapped to up to the first three OFDM symbols. The remaining portion of subframe 303 may include resource elements corresponding to the physical downlink shared channel (PDSCH). As explained above with respect to subframes 301 and 319, subsequent to receipt of subframe 303, the UE may receive another subframe (not shown) including a portion similar to portion 321. This portion may include resource elements corresponding to the physical downlink control channel (PDCCH) mapped to up to the first three OFDM symbols. These resource elements may convey information regarding the downlink data grant. The remaining portion of this subframe may include resource elements corresponding to the physical downlink shared channel (PDSCH). The resource elements may be selectively assigned based on any pattern. By way of example, the third subframe may include control channel resource elements (for example, PDCCH related resource elements) and shared channel resource elements (for example, PDSCH related resource elements) conveyed by a plurality of subcarrier frequencies over a plurality of time slots, each of the shared channel resource elements may be defined by a single time slot of the plurality of time slots and a single subcarrier frequency of the plurality of subcarrier frequencies of the subframe. The UE may decode at least one of the control channel resource elements to determine if the control channel resource elements include a grant resource that indicates that a resource element pattern of the shared channel resource elements includes information directed for the UE. The resource element pattern may be of a plurality of selectively assignable resource element patterns of the shared channel resource elements. Additionally and/or alternatively, the resource element pattern may be any one of the patterns discussed above and/or below with respect to subframe 301.

At a subsequent time, an interval $t_1$ following the receipt of subframe 303, UE 103 may receive another subframe 305. Subframe 305 may also include resource elements, described further with respect to FIGS. 4 and 5. Subframe 305 may include a portion 317, including resource elements corresponding to the physical downlink control channel (PDCCH) mapped to up to the first three OFDM symbols. The remaining portion of subframe 305 may include resource elements corresponding to the physical downlink shared channel (PDSCH).

UE 103 may transmit subframes 307, 309, and 311 on the uplink transmission link as a result of persistent uplink grant. Although not shown in FIG. 3, each of subframes 307, 309, and 311 may be followed by a subframe including data mapped to the physical uplink shared channel (PUSCH). In one embodiment, the UE may transmit subframe 307 at a time between the first time (the first time interval $t_1$) and the second time (the second time interval $t_1$). The third subframe (311, for example) may include a channel quality indicator. UE 103 may also transmit subframe 309 including shared channel resource elements including selectively assignable resource element patterns. Indeed, any of the resource element patterns explained above and/or below with respect to downlink grants may be used for uplink grants, as well. The UE may transmit subframe 309 at a time between the second time and a third time. The UE may transmit information concerning a voice call, for example, as part of these subframes.

Figure 4:
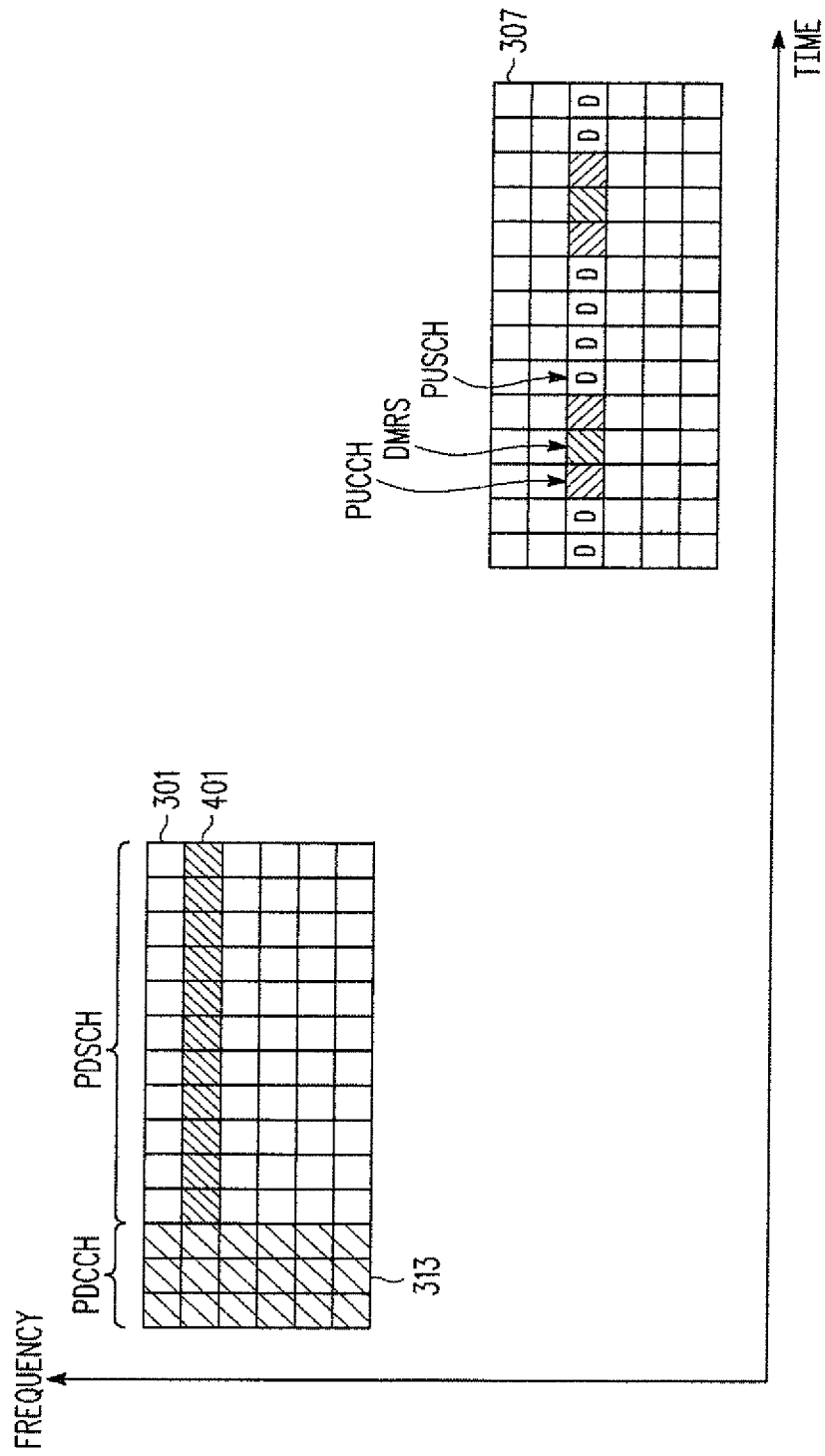
FIG. 4 shows exemplary details of the subframes of FIG. 3.

FIG. 4 shows exemplary details of the subframes of FIG. 3, including resource element patterns. Subframe 301 may include a portion 313, including resource elements corresponding to the physical downlink control channel (PDCCH) mapped to up to the first three OFDM symbols. By way of example, FIG. 4 shows resource elements corresponding to PDCCH being mapped on all of the resource elements corresponding to the first three OFDM symbols. The remaining portion of subframe 301 may include resource elements corresponding to the physical downlink shared channel (PDSCH). FIG. 4 shows resource elements corresponding to a row 401 of resource elements being mapped to physical downlink shared channel (PDSCH). The resource element pattern may be one of a plurality of selectively assignable resource element patterns of the shared channel resource elements (patterns of PDSCH resource elements, for example). The selectively assignable resource element patterns may include resource elements defined by a single subcarrier frequency of a plurality of subcarrier frequencies. Alternatively and/or additionally, the selectively assignable resource element patterns may include resource elements defined by a single subcarrier frequency of a plurality of subcarrier frequencies across all time slots of the shared channel resource elements. Although FIG. 4 shows resource elements corresponding to the physical downlink control channel (PDCCH) mapped to the first three OFDM symbols, they may be mapped to up to fewer or more OFDM symbols.

Referring still to FIG. 4, subframe 307 may include resource elements mapped to physical uplink control channel (PUCCH), demodulation reference signal (DMRS), and physical uplink shared channel (PUSCH). The resource elements mapped to the physical uplink shared channel (PUSCH) are shown by symbol D.

Figure 5:
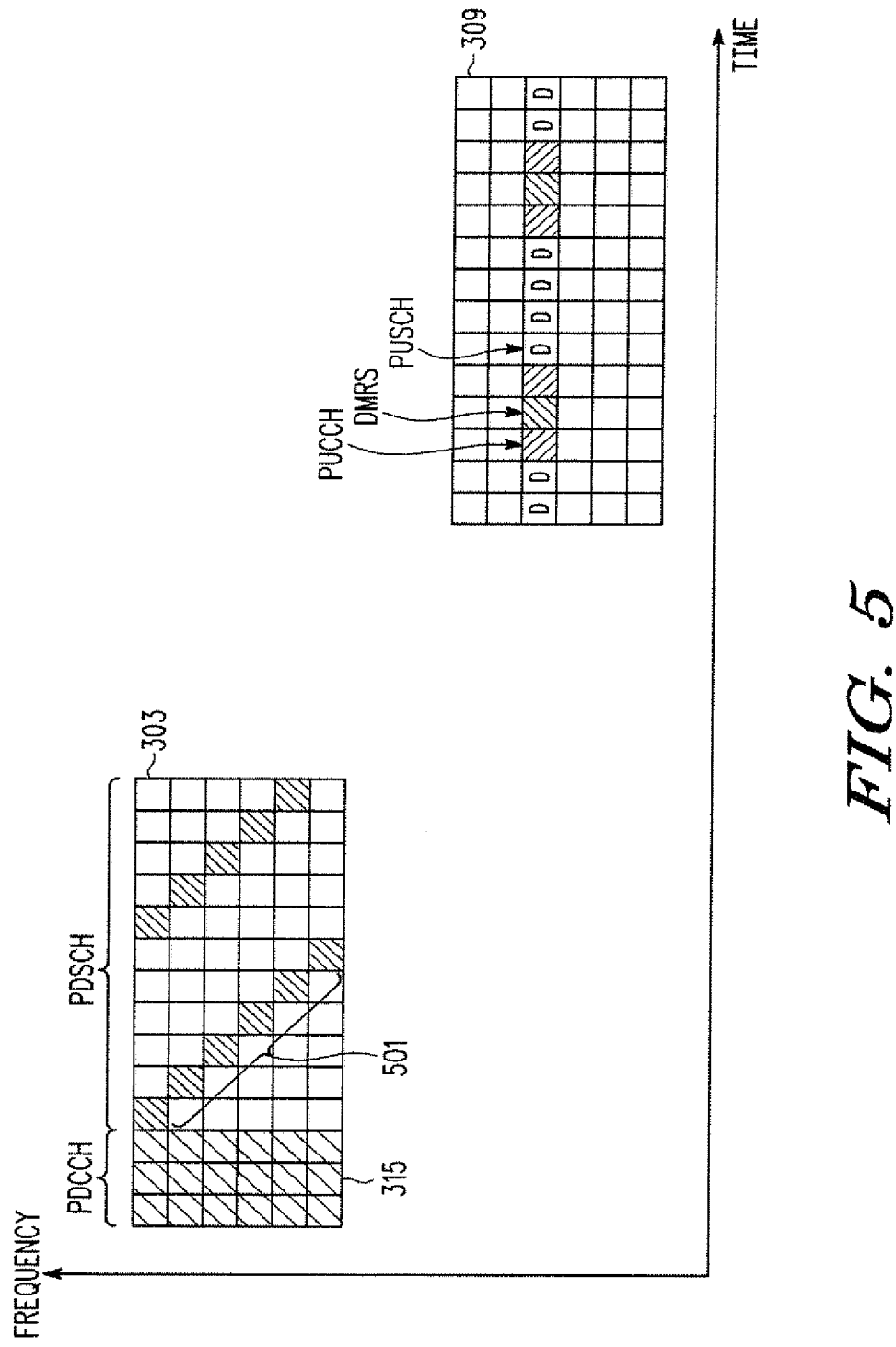
FIG. 5 shows exemplary details of the subframes of FIG. 3.

FIG. 5 shows exemplary details of the subframes of FIG. 3, including additional resource element patterns. Subframe 303 may include a portion 315, including resource elements corresponding to the physical downlink control channel (PDCCH) mapped to up to the first three OFDM symbols. FIG. 5 shows resource elements mapped in a frequency hopped fashion (501) to physical downlink shared channel (PDSCH). Although FIG. 5 shows a specific frequency hopped mapping any other suitable mapping may also be used. Thus, as shown in FIG. 5, an exemplary resource element pattern may include a resource element defined by a first subcarrier frequency of a first plurality of subcarrier frequencies at a first time slot of a first plurality of time slots and no resource elements defined by a second subcarrier frequency of the first plurality of subcarrier frequencies at the first time slot, and a second resource element defined by the second subcarrier frequency of the first plurality of subcarrier frequencies at a second time slot of the first plurality of time slots and no resource element defined by the first subcarrier frequency at the second time slot. Although FIG. 5 shows resource elements corresponding to the physical downlink control channel (PDCCH) mapped to the first three OFDM symbols, they may be mapped to up to fewer or more OFDM symbols.

Referring still to FIG. 5, subframe 309 may include resource elements mapped to physical uplink control channel (PUCCH), demodulation modulation reference signal (DMRS), and physical uplink shared channel (PUSCH). The resource elements mapped to the physical uplink shared channel (PUSCH) are shown by symbol D.

Figure 6:
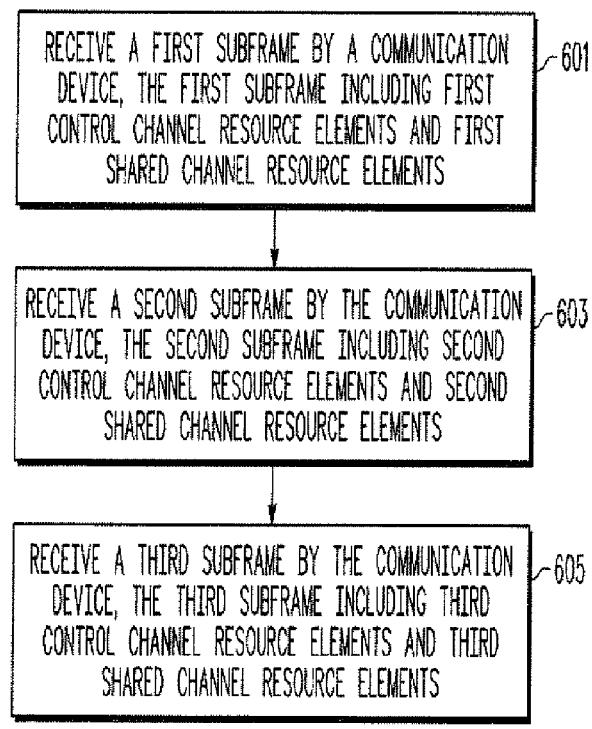
FIG. 6 shows a flowchart for an exemplary method of communicating information.

FIG. 6 shows a flowchart for an exemplary method of communicating information by a wireless communication device, such as anyone of UEs 103 and 105 of FIG. 1. As part of step 601, UE 103 may receive a first subframe (301 of FIG. 3, for example). As explained above with respect to FIG. 3, subframe 301 may include a first control channel resource elements (resource elements corresponding to portion 313, for example) and first shared channel resource elements (any of the resource elements in the remaining portion of subframe 301, for example). The resource elements may be conveyed by subcarriers corresponding to an OFDMA signal, for example. In one embodiment, resource elements may be conveyed by subcarrier frequencies at each time slot of a plurality of time slots. The resource elements corresponding to the physical shared data channel may have any pattern, for example, a row of resource elements may correspond to the physical shared data channel. Alternatively, a frequency hopped pattern of resource elements may correspond to the physical shared data channel. By way of example, the first shared channel resource elements may be defined by a single time slot of the first plurality of time slots and a single subcarrier frequency of the first plurality of subcarrier frequencies of the first subframe.

As part of step 603, UE 103 may receive a second subframe (303 of FIG. 3, for example). As explained above with respect to FIG. 3, subframe 303 may include a first control channel resource elements (resource elements corresponding to portion 313, for example) and first shared channel resource elements (any of the resource elements in the remaining portion of subframe 303, for example).

As part of step 605, UE 103 may receive a third subframe (305 of FIG. 3, for example). As explained above with respect to FIG. 3, subframe 305 may include a first control channel resource elements (resource elements corresponding to portion 313, for example) and first shared channel resource elements (any of the resource elements in the remaining portion of subframe 305, for example).

Some of the above embodiments, as applicable, may be implemented using a variety of different information processing systems. For example, although FIG. 1 and the discussion thereof describe an exemplary communication system, this exemplary communication system is presented merely to provide a useful reference in discussing various aspects of the invention. Of course, the description of the communication system has been simplified for purposes of discussion, and it is just one of many different types of appropriate communication systems that may be used in accordance with the invention. In addition, although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method, comprising:
   at a wireless communication device:
   receiving a first subframe at a first time including an indication of a second subframe to be received at a second time subsequent to the first time;
   receiving the second subframe at the second time, wherein the second subframe comprises a control portion that includes a plurality of resource elements corresponding to a physical downlink control channel (PDCCH) and a shared portion that includes a plurality of resource elements corresponding to a physical downlink shared channel (PDSCH), wherein each resource element of the plurality of resource elements corresponding to the PDSCH is defined by a time slot and a subcarrier frequency;
   determining whether the second subframe includes a grant resource that indicates that the shared portion of the second subframe includes a resource element pattern that is selectively assigned to the wireless communication device, wherein each resource element pattern is comprised of the plurality of resource elements corresponding to the PDSCH; and
   determining the time slot and subcarrier frequency for each resource element in the selectively assignable resource element pattern, wherein the selectively assignable resource element pattern is one of a plurality of selectively assignable resource element patterns suitable for the wireless communication device at the second time.

2. The method of claim 1, further comprising:
   when the second subframe includes the grant resource that indicates that the shared portion of the second subframe includes the resource element pattern that is selectively assigned to the wireless communication device, decoding the resource element pattern that is selectively assigned to the wireless communication device to obtain information, wherein the information obtained is for a single voice call.

3. The method of claim 1, wherein the plurality of selectively assignable resource element patterns includes a resource element pattern that provides a maximum gain for the wireless communication device.

4. The method of claim 1, wherein the plurality of resource elements corresponding to the PDCCH are mapped up to a first three OFDMA symbols.

5. The method of claim 1, further comprising:
   prior to the receiving of the second subframe, placing receiving circuitry of the wireless communication device in an operating mode; and
   subsequent to the receiving of the second subframe and before receiving a further subframe, placing the receiving circuitry in a low power mode, wherein the further subframe is related to the first subframe and the second subframe.

6. The method of claim 1, wherein the indication of the second subframe includes an identification of at least a single subcarrier frequency and of at least a single time slot.

7. The method of claim 1, wherein the resource elements corresponding to the PDSCH are defined by at least a single time slot and at least a single subcarrier frequency.

8. The method of claim 1, wherein the resource element pattern is assigned to the PDSCH based on at least one of currently available subcarriers and time slots, a type of data transfer or a quality of service requirement of the wireless communication device.

9. The method of claim 1, wherein the first subframe includes a grant resource, wherein the grant resource is one of a persistent grant or a semi-persistent grant.

10. The method of claim 1, wherein at least one of the plurality of selectively assignable resource element patterns is based on a frequency hopping scheme.

11. The method of claim 1, wherein the resource element pattern includes information for the wireless communication device and does not include information for a further wireless communication device.

12. A wireless communication device comprising:
a receiver configured to receive a first subframe at a first time including an indication of a second subframe to be received at a second time subsequent to the first time and to receive the second subframe at the second time, wherein the second subframe comprises a control portion that includes a plurality of resource elements corresponding to a physical downlink control channel (PDCCH) and a shared portion that includes a plurality of resource elements corresponding to a physical downlink shared channel (PDSCH), wherein each resource element of the plurality of resource elements corresponding to the PDSCH is defined by a time slot and a subcarrier frequency;
a processor configured to determine whether the second subframe includes a grant resource that indicates that the shared portion of the second subframe includes a resource element pattern that is selectively assigned to the wireless communication device, wherein each resource element pattern is comprised of the plurality of resource elements corresponding to the PDSCH and the processor is further configured to determine the time slot and subcarrier frequency for each resource element in the selectively assignable resource element pattern, wherein the selectively assignable resource element pattern is one of a plurality of selectively assignable resource element patterns suitable for the wireless communication device at the second time.

13. The device of claim 12, further comprising:
a decoder configured to decode the second subframe to obtain information when the second subframe includes the grant resource that indicates that that the shared portion of the second subframe includes the resource element pattern that is selectively assigned to the wireless communication device, wherein the information obtained is for a single voice call.

14. The device of claim 12, wherein:
prior to the receiving of the second subframe, the receiver of the wireless communication device is placed in an operating mode, and
subsequent to receiving the second subframe, the receiver of the wireless communication device is placed in a low power mode.

15. The device of claim 12, wherein the plurality of selectively assignable resource element patterns includes a resource element pattern that provides a maximum gain for the wireless communication device.

16. The device of claim 12, wherein one of the plurality of resource element patterns includes a plurality of resource elements defined by a single subcarrier frequency.

17. The device of claim 12, wherein the first subframe further provides an indication of the resource element pattern selectively assigned to the wireless communication device.

18. The device of claim 12, wherein at least one of the plurality of selectively assignable resource element patterns is based on a frequency hopping scheme.

19. The device of claim 14, further comprising:
a transmitter configured to transmit a channel feedback information to a base station, wherein the first subframe and the second subframe are sent to the wireless communication device from the base station and subsequent to receiving the first subframe, the wireless communication device measures the channel feedback information and subsequent to receiving the second subframe, while the receiver of the wireless communication device is in low power mode, the transmitter transmits the channel feedback information to the base station, and
wherein the wireless communication device receives a further subframe from the base station comprising one of the plurality of selectively assignable resource element patterns that was assigned to the wireless communication device based on the channel feedback information.

20. An integrated circuit, comprising:
receiving circuitry to receive a first subframe at a first time including an indication of a second subframe to be received at a second time subsequent to the first time and to receive the second subframe at the second time, wherein the second subframe comprises a control portion that includes a plurality of resource elements corresponding to a physical downlink control channel (PDCCH) and a shared portion that includes a plurality of resource elements corresponding to a physical downlink shared channel (PDSCH), wherein each resource element of the plurality of resource elements corresponding to the PDSCH is defined by a time slot and a subcarrier frequency;
grant resource determining circuitry to determine whether the second subframe includes a grant resource that indicates that the shared portion of the second subframe includes a resource element pattern that is selectively assigned to the integrated circuit, wherein each resource element pattern is comprised of the plurality of resource elements corresponding to the PDSCH; and
time slot and subcarrier frequency determining circuitry to determine the time slot and subcarrier frequency for each resource element pattern in the selectively assignable resource element pattern, wherein the selectively assignable resource element pattern is one of a plurality of selectively assignable resource element patterns suitable for the integrated circuit at the second time.

* * * * *

UNITED STATES PATENT AND TRADEMARK OFFICE
CERTIFICATE OF CORRECTION

PATENT NO. : 9,723,600 B2
APPLICATION NO. : 13/544887
DATED : August 1, 2017
INVENTOR(S) : McCoy et al.

Page 1 of 1

It is certified that error appears in the above-identified patent and that said Letters Patent is hereby corrected as shown below:

Claim 13, Column 9, Line 53 should be replaced with the following Line:
"the grant resource that indicates that the shared"

Signed and Sealed this
Twenty-fourth Day of April, 2018

Andrei Iancu
*Director of the United States Patent and Trademark Office*